(12) United States Patent
Rudi et al.

(10) Patent No.: US 7,472,725 B2
(45) Date of Patent: Jan. 6, 2009

(54) HEAT-INSULATED CONDUIT

(75) Inventors: Roberto Rudi, Schinznach-Dorf (CH); Robert Schneider, Uster (CH); Roland Demuth, Ennetbaden (CH)

(73) Assignee: Brugg Rohr AG, Holding, Brugg (CH)

( * ) Notice: Subject to any disclaimer, the term of this patent is extended or adjusted under 35 U.S.C. 154(b) by 0 days.

(21) Appl. No.: 11/818,446

(22) Filed: Jun. 13, 2007

(65) Prior Publication Data
US 2007/0289654 A1 Dec. 20, 2007

(30) Foreign Application Priority Data
Jun. 14, 2006 (DE) .................. 20 2006 009 337 U

(51) Int. Cl.
*F16L 9/14* (2006.01)
(52) U.S. Cl. .................. 138/149; 138/140; 138/137; 138/121
(58) Field of Classification Search .................. 138/137, 138/140, 141, 149, 121, 122
See application file for complete search history.

(56) References Cited

U.S. PATENT DOCUMENTS

| | | | | | |
|---|---|---|---|---|---|
| 3,687,765 | A | * | 8/1972 | MacLean et al. | ............ 156/187 |
| 3,979,818 | A | * | 9/1976 | Groch et al. | ................ 29/455.1 |
| 4,559,973 | A | * | 12/1985 | Hane et al. | ................... 138/138 |
| 4,657,050 | A | * | 4/1987 | Patterson | ..................... 138/149 |
| 5,183,299 | A | * | 2/1993 | Hallerstrom et al. | .......... 285/47 |
| 5,934,337 | A | * | 8/1999 | Fiala et al. | ................... 138/149 |
| 6,988,515 | B2 | * | 1/2006 | Oishi et al. | ................. 138/143 |
| 2005/0121093 | A1 | * | 6/2005 | Rantalainen | ................ 138/121 |

FOREIGN PATENT DOCUMENTS

| | | |
|---|---|---|
| AT | 43001 | 2/1987 |
| DE | 3307120 A1 | 9/1984 |
| DE | 8911934 U1 | 3/1990 |
| DE | 29615423 U1 | 4/1997 |
| DE | 20022368 U1 | 10/2001 |
| DE | 20303698 U1 | 6/2003 |
| DE | 102004046656 A1 | 4/2006 |
| EP | 0897788 B1 | 10/2001 |
| GB | 2215427 A | 9/1989 |
| WO | 2004/029501 A1 | 4/2004 |

* cited by examiner

*Primary Examiner*—Patrick F Brinson
(74) *Attorney, Agent, or Firm*—Ware, Fressola, Van der Sluys & Adolphson LLP

(57) ABSTRACT

A heat-insulated conduit having at least one internal tube (1), a heat-insulating layer (2), an intermediate layer (3), a film (4) and a corrugated external tube (5).

12 Claims, 1 Drawing Sheet

HEAT-INSULATED CONDUIT

BACKGROUND OF THE INVENTION

1. Technical Field

The invention relates to a heat-insulated conduit having at least one internal tube, a heat-insulating layer based on polyurethane foam and surrounding the internal tube, a film surrounding the heat-insulating layer and a corrugated external tube made of thermoplastic.

2. Description of the Background Art

EP 0 897 788 B1 discloses a heat-insulated conduit for use in local and district heating systems, as drinking-water and wastewater conduits, and in numerous other special sectors, which conduit is made up of an internal tube carrying the medium and made of plastic, preferably cross-linked polyethylene; a heat-insulating layer based on polyurethane foam and surrounding the internal tube; and an external jacket made of plastic and equipped with a corrugation. A film made of plastic is additionally provided between the heat-insulating layer and the external jacket.

The known conduit is easy to bend, and can be delivered directly to the construction site coiled into rings or onto drums. Because it is easy to bend, the conduit can be adapted without difficulty to almost all terrain conditions during installation.

With the known conduit, which is available on the market under the brand name "Calpex," the heat-insulating layer is made of hard polyurethane foam, which imparts outstanding heat-insulating properties to the conduit. A disadvantage of this conduit is that the bending radius is relatively large and is limited, for example in the case of the smallest type of tubing, to 0.7 m.

SUMMARY OF THE INVENTION

The object of the present invention is to improve the known conduit in such a way that it can be bent to even smaller radii without tearing the film. A further intention is, in particular, that the heat-insulation value not be too greatly degraded. In addition, it is intended that the transverse rigidity of the conduit not be degraded.

This object is achieved by having:

(a) the heat-insulating layer made of a partially open-cell polyurethane foam having an elongation at breakage of more than 15%;

(b) an elastically deformable intermediate layer made of a soft plastic foam between the heat-insulating layer and the film, the intermediate layer being adhesively bonded at least to the film; and (c) the external tube provided with corrugations having a corrugation depth from 5/D to 12/D and a corrugation spacing from 10/D to 25/D, where D is the outside diameter of the external tube measured across the corrugation peaks.

Desirably, the intermediate layer is made of polyethylene foam and/or is an extruded layer.

The intermediate layer can be made up of a strip of foam material that is placed in longitudinally extending fashion onto the internal tube, or is wound helically onto the internal tube. The ratio of wall thicknesses of the heat-insulating layer and the intermediate layer is between 10 and 2.

The at least one internal tube can be made of cross-linked polyethylene while the external tube can be made of high density polyethylene.

In one aspect of the invention, the film is impermeable to water, water vapor and propellant. The film can be an aluminum foil that has a copolymer layer on at least one side or a metallized plastic film.

The essential advantage of the invention may be seen in the fact that with simple means, a highly flexible heat-insulated conduit has been made available which exhibits heat-insulating properties that deviate only slightly from the good heat-insulating properties of the known conduit. As a result of the modified values for the corrugation, the conduit according to the present invention acquires a transverse stability that corresponds to that of the known conduit, even though the heat-insulating layer or intermediate layer is "softer" than the polyurethane foam layer of the known conduit. The "soft" intermediate layer furthermore has the additional advantage that it serves as a cushioning layer for the film, and tearing of the film upon bending of the conduit is avoided.

The invention is explained in more detail with reference to the exemplifying embodiment depicted schematically in the single FIGURE.

DETAILED DESCRIPTION OF THE INVENTION

Figure 1:
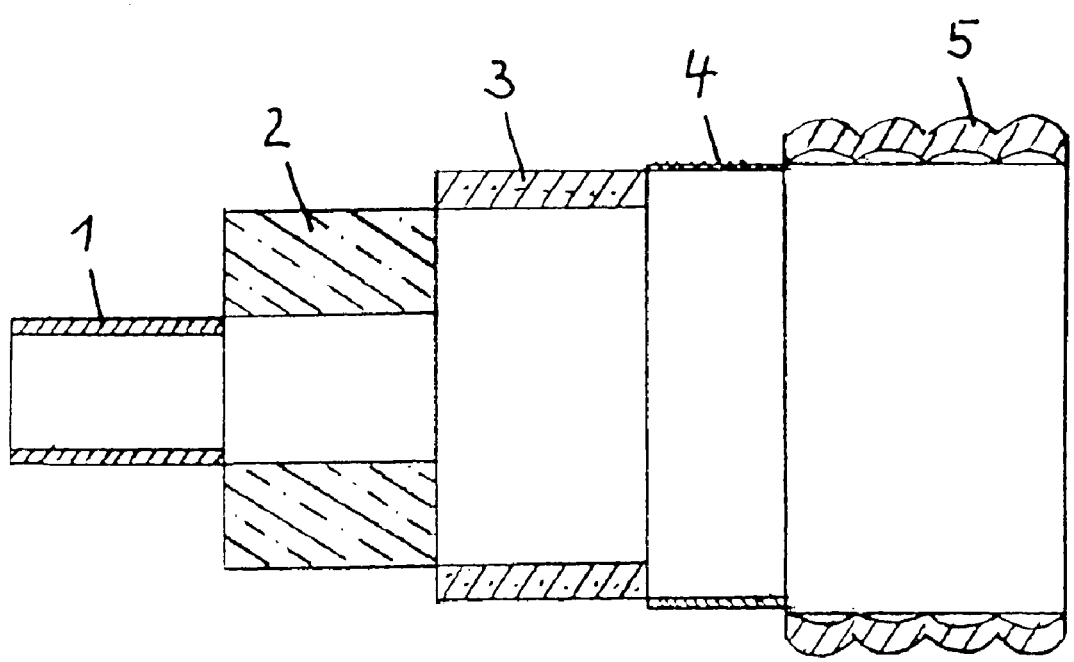
FIG. 1 is a cross-sectional view of the conduit according to the present invention.

An internal tube 1 serves to transport the medium and is advantageously made of cross-linked polyethylene. It can comprise, inside its wall or thereabove, a diffusion barrier layer for water vapor. The diffusion barrier layer can be a metal foil or a suitable plastic film. Instead of the single internal tube depicted in the FIGURE, two or more internal tubes can also be provided. Internal tube 1 or the internal tubes are surrounded by a heat-insulating layer 2 that is made of a partially open-cell polyurethane foam. The polyurethane foam that is used is somewhat softer than the polyurethane foam used in the conduit according to the existing art. Heat-insulating layer 2 is surrounded by an intermediate layer 3 that is made of an elastically deformable foam material. A polyethylene foam is preferred, but a foam material based on polyurethane can also be used.

Intermediate layer 3 can be applied onto heat-insulating layer 2 in the form of a strip, either by longitudinal placement or by winding. It is preferred, however, to apply intermediate layer 3 by extrusion.

Located above intermediate layer 3 is a film 4 that serves as a diffusion barrier layer. The purpose of film 4 is to prevent the penetration of water vapor into intermediate layer 3 or into heat-insulating layer 2. It is furthermore intended to prevent the escape of the propellant present in the cells of the foam material in layers 2 and 3. Film 4 is made of a diffusion-proof plastic such as, for example, EVOH, but it can also be made of metal, e.g. aluminum, aluminum coated with a copolymer, or a metallized plastic film. The use of a metal-containing film 4 has the further advantage that the heat-insulating effect is improved by a reduction in radiative losses.

Film 4 should be adhesively bonded to at least one of the adjacent layers 3 or 5 in order to prevent tearing of film 4 in the event of bending. Intermediate layer 3 has the additional purpose of absorbing radial expansion of internal tube 1 and thereby preventing damage to film 4.

External tube 5 is an annularly corrugated plastic tube that is preferably made of a high density polyethylene (HDPE). The manufacture of external tube 5 is described in EP 0 897 788. In contrast to the known external tube, the corrugation of external tube 5 is configured so that a greater transverse rigidity can be achieved, and greater traffic loads can thus be absorbed.

In contrast to the known conduit, in which the heat-insulating layer is made of hard polyurethane foam, the softer foam in the conduit according to the invention does not have such a high transverse rigidity. In the event of a mechanical load, e.g. in the event of bending or a force acting in the radial direction, the wall thickness of the heat-insulating layer would decrease, with the result that greater heat losses occur at the location at which the force is acting.

For that purpose, the corrugation spacing is shorter, and the corrugation depth greater, than in the case of the known conduit.

For heat-insulating layer 2, a polyurethane foam having the following properties is used:

| | |
|---|---|
| Density | 45-65 kg/m$^3$ |
| Elongation at breakage | more than 15% |
| Compressive strength | 50 to 100 kPa |

Intermediate layer 3 is made of a polyethylene foam that is produced by extrusion.

Its properties are:

| | |
|---|---|
| Density | 20-40 kg/m$^3$ |
| Elongation at fracture | >100% |
| Compressive strength | 5-30 kPa |

External tube 5 has the following values:

| | | |
|---|---|---|
| Wall thickness | 1.0-2.5 | mm |
| Corrugation spacing | 10-25 | mm |
| Corrugation depth | 5-12 | mm |
| Outside diameter | 90 to 180 | mm |

The values indicated apply to a specific conduit type. The values for external tube 5 in particular may change from one conduit type to another.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

What is claimed is:

1. A heat-insulated conduit, having at least one internal tube, a heat-insulating layer based on polyurethane foam and surrounding the at least one internal tube, a film surrounding the heat-insulating layer, and a corrugated external tube made of thermoplastic, characterized by the following features:
   (a) the heat-insulating layer being made of a partially open-cell polyurethane foam having an elongation at breakage of more than 15%;
   (b) an elastically deformable intermediate layer made of a soft plastic foam between the heat-insulating layer and the film, the intermediate layer being adhesively bonded at least to the film; and
   (c) the external tube provided with corrugations having a corrugation depth from 5/D to 12/D and a corrugation spacing from 10/D to 25/D, where D is the outside diameter of the external tube measured across the corrugation peaks.

2. The heat-insulated conduit according to claim 1, wherein the intermediate layer is made of polyethylene foam.

3. The heat-insulated conduit according to claim 2, wherein the intermediate layer is an extruded layer.

4. The heat-insulated conduit according to claim 1, wherein the intermediate layer is an extruded layer.

5. The heat-insulated conduit according to claim 1, wherein the intermediate layer is made up of a strip of foam material placed in longitudinally extending fashion onto the internal tube.

6. The heat-insulated conduit according to claim 1, wherein the intermediate layer is made up of a strip of foam material wound helically onto the internal tube.

7. The heat-insulated conduit according to claim 1, wherein the ratio of the wall thicknesses of the heat-insulating layer and the intermediate layer is between 10 and 2.

8. The heat-insulated conduit according to claim 1, wherein the at least one internal tube being made of cross-linked polyethylene.

9. The heat-insulated conduit according to claim 1, wherein the external tube is made of high density polyethylene.

10. The heat-insulated conduit according to claim 1, wherein the film is impermeable to water, water vapor and propellant.

11. The heat-insulated conduit according to claim 10, wherein the film is an aluminum foil that has a copolymer layer on at least one side.

12. The heat-insulated conduit according to claim 10, wherein the film is a metallized plastic film.

* * * * *